US009338793B2

(12) United States Patent
Guo et al.

(10) Patent No.: US 9,338,793 B2
(45) Date of Patent: May 10, 2016

(54) METHODS FOR ALLOCATING AND SCHEDULING UPLINK AND DOWNLINK TRANSMISSIONS AND APPARATUSES THEREOF

(71) Applicant: Alcatel-Lucent USA Inc., Murray Hill, NJ (US)

(72) Inventors: Katherine Guo, Scotch Plains, NJ (US); Thomas Y. Woo, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 699 days.

(21) Appl. No.: 13/622,052

(22) Filed: Sep. 18, 2012

(65) Prior Publication Data

US 2014/0078969 A1 Mar. 20, 2014

(51) Int. Cl.
*H04W 4/00* (2009.01)
*H04W 72/12* (2009.01)

(52) U.S. Cl.
CPC ........ *H04W 72/1268* (2013.01); *H04W 72/121* (2013.01)

(58) Field of Classification Search
None
See application file for complete search history.

(56) References Cited

U.S. PATENT DOCUMENTS

| 2007/0223508 | A1* | 9/2007 | Nandagopalan | ...... H04W 16/14 370/431 |
| 2010/0159921 | A1* | 6/2010 | Choi | ..................... H04L 1/0029 455/425 |
| 2011/0013608 | A1  | 1/2011 | Lee et al. | |
| 2013/0094486 | A1* | 4/2013 | Bhanage | ............... H04W 88/08 370/338 |

FOREIGN PATENT DOCUMENTS

EP          1783957 A1 *  5/2007   ............ H04L 1/1887

OTHER PUBLICATIONS

Banchs, A. et al., "Proportional fair throughout allocation in multirate IEEE 802.11e wireless LANs," The Journal of Mobile Communication, vol. 13, No. 5, pp. 649-662, Jun. 15, 2006.*
Bhanage, G. et al., SplitAP: Lerveraging Wireless Network Virtualization for Flexible Sharing of WLANs, IEEE Global Telecommunications Conference (GLOBECOM 2010), Dec. 2010.*
Banchs, A. et al., "Proportional fair throughout allocation in multirate IEEE 802.11e wireless LANs," The Journal of Mobile Communication, vol. 13, No. 5, pp. 649-662, Jun. 15, 2006.
International Search Report and Written Opinion dated Jan. 24, 2014.
(Continued)

*Primary Examiner* — Kwang B Yao
*Assistant Examiner* — Hardikkumar Patel
(74) *Attorney, Agent, or Firm* — Harness, Dickey & Pierce, P.L.C.

(57) ABSTRACT

At least one example embodiment discloses a method for allocating uplink transmissions from a plurality of user equipments (UEs) to a base station. The method includes allocating uplink transmission air-time of the base station to a plurality of groups, associating each of the plurality of UEs to the plurality of groups, a throughput of each associated UE in a same group being affected by the remaining UEs in the same group and determining a resource sharing mode associated with each of the plurality of groups, the resource sharing mode being one of a first mode and a second mode, the base station allocating the same throughput to each associated UE in the associated group in the first mode and the base station allocating a same transmission air-time to each associated UE in the associated group in the second mode.

22 Claims, 5 Drawing Sheets

(56) References Cited

OTHER PUBLICATIONS

Garroppo, R.G. et al., "Downlink Proportional Fairness in 802.11 Networks Adopting the Deficit Transmission Time Scheduler," http://telematica.polito.it/oldsite/courrnayeur06/papers/35-C.1.1.pdf.

Bhanage, G. et al., "SplitAP: Lerveraging Wireless Network Virtualization for Flexible Sharing of WLANs," IEEE Global Telecommunications Conference (GLOBECOM 2010), Dec. 2010.

Yoon, J. et al., "Maximizing Differentiated Throughput in IEEE 802.11e Wireless LANs," IEEE, pp. 411-417, 2006.

Tay, Y.C., et al., "A Capacity Analysis for the IEEE 802.11 MAC Protocol," Wireless Networks 7, pp. 159-171, 2001.

Garroppo, R.G., et al., "Providing air-time usage fairness in IEEE 802.11 networks with the deficit transmission time (DTT) scheduler," Wireless Networks, vol. 13, pp. 481-495, Aug. 2007.

IEEE 802.11: Wireless LAN Medium Access Control (MAC) and Physical Layer (PHY) Specifications. (2007 revision), Jun. 2007.

IEEE 802.11n: Part 11: Wireless LAN Medium Access Control (MAC) and Physical Layer (PHY) Specifications. Oct. 29, 2009.

\* cited by examiner

METHODS FOR ALLOCATING AND SCHEDULING UPLINK AND DOWNLINK TRANSMISSIONS AND APPARATUSES THEREOF

BACKGROUND

In the past few years, mobile data traffic has grown. As this trend continues, and WiFi-enabled mobile devices become more abundant and diverse, wireless service providers (WSPs) that operate traditional cellular networks are beginning to realize potential in leveraging WiFi hot-spot services to offload data traffic from 3G/4G cellular networks.

In a typical deployment, a mobile node or station equipped with an IEEE 802.11 interface communicates over the air to an access point (AP), such as a IEEE 802.11 base station that is connected to a wired backbone network. The coverage range of a WiFi AP is relatively small (about 20 meters indoors), and multiple overlapping APs are used to service large areas. As a result, APs are deployed in high density in order to cover large areas with high traffic demand. As deployment density increases, WiFi AP installation and management quickly becomes significant overhead for WSPs.

SUMMARY

To reduce WSPs' capital expenditure and operation expenditure for operating WiFi APs, example embodiments disclose a virtual WiFi network for multiple WSPs to share the same physical WiFi AP in a controlled fashion where each WSP sharing the same AP is provided the illusion that it has sole control of the AP with a fraction of the total AP capacity.

Moreover, methods of scheduling uplink and downlink transmissions, a downlink scheduler and an uplink scheduler are disclosed.

The downlink scheduler offers proportional air-time share among slices or groups under either single-rate or multi-rate settings. Within a group of UEs, the downlink scheduler offers (1) equal air-time share among users or (2) equal throughput share among users.

Likewise, the uplink scheduler offers proportional air-time share among slices or groups under either single-rate or multi-rate settings. Within a group of UEs, the uplink scheduler offers (1) equal air-time share among users or (2) equal throughput share among users.

At least one example embodiment discloses a method for allocating uplink transmissions from a plurality of user equipments (UEs) to a base station. The method includes allocating uplink transmission air-time of the base station to a plurality of groups, associating each of the plurality of UEs to the plurality of groups, a throughput of each associated UE in a same group being affected by the remaining UEs in the same group and determining a resource sharing mode associated with each of the plurality of groups, the resource sharing mode being one of a first mode and a second mode, the base station allocating the same throughput to each associated UE in the associated group in the first mode and the base station allocating a same transmission air-time to each associated UE in the associated group in the second mode.

In an example embodiment, the method further includes receiving transmissions from the plurality of UEs based on the determining.

In an example embodiment, the determining a resource sharing mode includes determining a profile associated with the base station and a profile associated with each of the plurality of UEs based on the resource sharing mode and transmitting the profiles to the plurality of UEs, respectively, wherein the receiving is based on the transmitted profiles.

In an example embodiment, for at least one of the plurality of groups, the transmitting includes transmitting a beacon to the UEs associated with the at least one group, the beacon indicating that each UE has the same profile.

In an example embodiment, the transmitting the beacon transmits the beacon in the first mode.

In an example embodiment, for at least one of the plurality of groups, the transmitting includes transmitting signals to the UEs associated with the at least one group, respectively.

In an example embodiment, the transmitting signals transmits the signals in the second mode.

In an example embodiment, each profile includes a minimum contention window value and a transmission opportunity limit value.

In an example embodiment, for each UE, the determining a profile determines the profile based on a size of the associated group, an average frame size of frames sent and received by the base station, a data rate of the UE and a highest data rate among all stations, the allocated uplink transmission air-time for the associated group and air-time for a sum of downlink transmissions allocated to the groups.

In an example embodiment, a reference station is defined as a station that receives the largest unit of bandwidth or throughput such that each station (UE or base station, that is, the AP) can be considered as an integral number of reference stations. As a result, each station maps to one or more reference stations.

In an example embodiment, for the base station (the AP), the determining a profile determines the profile based on an average frame size of frames sent and received by the base station, a highest data rate among all stations, the allocated uplink transmission air-time for all the groups and air-time for a sum of downlink transmissions allocated to the groups.

In an example embodiment, $$C_i = C_d/V_i$$

wherein $C_i$ is the minimum contention window value for a station i, $C_d$ is a contention window value for a reference station d, and $V_i$ is a ratio of throughput of the station i to the reference station d.

In an example embodiment, the determining a profile for the reference station d includes adjusting $C_d$ to $C_{d\_practice}$ such that $C_{d\_practice}$ is one of a smallest power of 2 larger than $C_d$ or a largest power of 2 smaller than $C_d$.

In an example embodiment, the adjusting CWmin $C_d$ includes adjusting $C_{d\_practice}$ to be $$MAX(8, C\_lo)$$

wherein C_lo is the largest power of 2 smaller than $C_d$.

In an example embodiment, the determining a profile for a UE includes adjusting the profile such that each associated UE in the group is allocated the same transmission air-time.

In an example embodiment, the determining a profile for a UE includes adjusting the profile such that each associated UE in the group is allocated the same throughput.

In an example embodiment, the determining a profile adjusts $C_i$ to be a power of 2.

In an example embodiment, the determining a profile determines a transmission opportunity limit value for each of the plurality of UEs.

In an example embodiment, the method further includes determining an allocated throughput for at least one UE, the determining an allocated throughput including adjusting the minimum contention window value and adjusting the transmission opportunity limit value after adjusting the minimum contention window value.

In an example embodiment, the method further includes determining an allocated throughput for the base station, the determining an allocated throughput including, adjusting a minimum contention window value for the base station, and adjusting a transmission opportunity limit value for the base station after adjusting the minimum contention window value for the base station.

In an example embodiment, the method further includes determining a contention window value for each of the plurality of groups, the UEs having the determined contention window value for the associated group.

In an example embodiment, the method further includes determining a contention window value and a TXOP value for the base station (the AP).

In an example embodiment, the allocating allocates the uplink transmission air-times to each of the plurality of groups, the allocated transmission air-times independent of the number of the plurality of UEs.

In an example embodiment, at least one group is associated with a different operator.

In an example embodiment, the at least one group includes a first group and a second group associated with a first operator, the first group being associated with a higher quality of service than the second group.

In an example embodiment, the base station is a WiFi access point.

In an example embodiment, the allocating includes allocating a portion of the uplink transmission air-time to each group.

An example embodiment discloses a method for allocating transmissions from a plurality of user equipments (UEs) to a base station. The method includes determining a size of a network, the size of the network being defined by a sum of sizes of the groups, respectively, each group including at least one UE and determining a resource sharing mode associated with each of the plurality of groups, the resource sharing mode being one of a first mode and a second mode, the base station allocating the same throughput to each UE in the associated group in the first mode and the base station allocating the same transmission air-time to each UE in the associated group in the second mode.

In an example embodiment, the method further includes allocating transmission air-times to each of the plurality of groups, the allocated transmission air-times independent of the number of the plurality of UEs.

In an example embodiment, at least one group is associated with a different operator.

In an example embodiment, the at least one group includes a first group and a second group associated with a first operator, the first group being associated with a higher quality of service than the second group.

An example embodiment discloses a method for allocating downlink transmissions to a plurality of user equipments (UEs) from a base station. The method includes allocating downlink transmission air-time of the base station to a plurality of groups, associating each of the plurality of UEs to the plurality of groups, a throughput of each associated UE in a same group being affected by the remaining UEs in the same group and determining a resource sharing mode associated with each of the plurality of groups, the resource sharing mode being one of a first mode and a second mode, the base station allocating the same throughput to each associated UE in the associated group in the first mode and the base station allocating the same transmission air-time to each associated UE in the associated group in the second mode.

In an example embodiment, the method further includes determining downlink transmission slices associated with the plurality of groups, each of the downlink transmission slices being associated with a queue.

In an example embodiment, the determining a downlink transmission slice includes determining weights for the queues, respectively.

In an example embodiment, the weight indicates a percentage of total downlink transmission air-time for the associated group.

In an example embodiment, the method further includes for each queue, determining a token to be removed from a bucket associated with the queue, the token being based on a cumulative frame transmission time for a previously transmitted frame, each bucket having a size.

In an example embodiment, the method further includes determining the queue associated with a largest bucket size and transmitting data to the group associated with the queue associated with the largest bucket size.

In an example embodiment, the method further includes decreasing the largest bucket size based on the weight of the associated group.

In an example embodiment, the method further includes increasing the bucket sizes of the buckets associated with queues that are not empty based on the weights of the respective associated groups.

In an example embodiment, the determining downlink transmission slices is based on the number of UEs in the respective groups.

In an example embodiment, at least one group is associated with a different operator.

In an example embodiment, the at least one group includes a first group and a second group associated with a first operator, the first group being associated with a higher quality of service than the second group.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

The term "station" may be understood as a base station or UE.

Communication from the base station to the UE is typically called downlink or forward link communication. Communication from the UE to the base station is typically called uplink or reverse link communication.

Air-time of a MAC layer data frame may be a time duration for a data frame and the corresponding acknowledgement (ACK) frame to occupy the channel. Air-time for a station (user station or the base station) is defined as the sum of the air-time for all the data frames it transmits.

Example embodiments are discussed below with reference to WiFi which is described in IEEE 802.11: *Wireless LAN Medium Access Control (MAC) and Physical Layer (PHY) Specifications*. (2007 revision), June 2007, and 802.11n-2009: *Wireless LAN Medium Access Control (MAC) and Physical Layer (PHY) Specifications Amendment 5: Enhancements for Higher Throughput*, the entire contents of each of which are incorporated herein by reference. However, it should be understood that example embodiments should not be limited to WiFi and various wireless and wired technologies use the example embodiments described below.

Virtual WiFi Network

In virtual WiFi, an access point (AP) allocates bandwidth or throughput to reference stations. A reference station is defined as a station that receives the largest unit of throughput such that each station (UE or base station, that is, the AP) can be considered as an integral number of reference stations. As a result, each station maps to one or more reference stations. For example, in a system with one station requiring throughput of 2B and another station requiring throughput of 3B, then the reference station requires throughput of B, and each of the actual stations are represented by 2 and 3 reference stations, respectively. The total number of reference stations in the system is the sum of all reference stations corresponding to each station. System size may refer to the total number of reference stations in the system.

Figure 1:
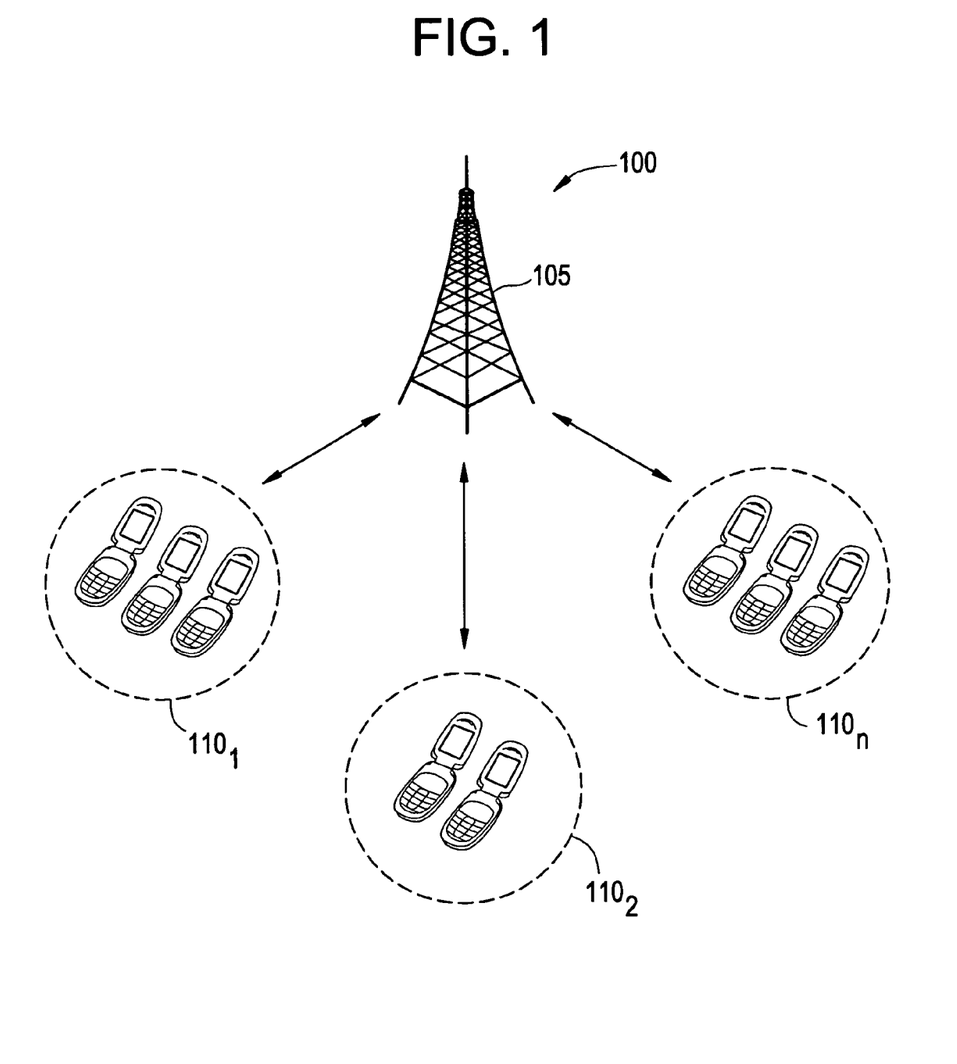
FIG. 1 illustrates an example embodiment of a virtual WiFi network.

FIG. 1 illustrates an example embodiment of a virtual WiFi network. As shown, an access point 105 communicates with a plurality of UEs within groups $110_1$-$110_n$. Each group can be the subscribers of an operator or the subscribers of a QoS class of an operator, for example. Each UE is associated with one of the groups $110_1$-$110_n$. Each group may be associated with a different operator. Each group includes two slices, one uplink and one downlink.

In the network 100, a single channel at the WiFi AP 105 is shared among multiple WSPs. In other words, the UEs belonging to different WSPs share the same radio channel. The AP 105 divides UEs into groups. Each operator signs up with the AP 105 for service, the AP 105 is configured with a unique SSID for each operator. UEs that are subscribers of an operator select the SSID for the operator from a list of SSIDs advertised by the AP 105. UEs then go through the authentication process specified by the WiFi standards in order to associate with the SSID and receive service from the AP 105.

For example, the AP 105 may divide the UEs into groups based on WSP or QoS class within the WSP. Each group may be mapped to a different service class, and UEs within a group receive similar performance.

Service flow may refer to all uni-directional traffic between an AP and a UE. An uplink direction is from the UE to the AP whereas the downlink direction is from the AP to the UE.

Slice may refer to an aggregate of service flows. Agreements between various WSPs and virtual WiFi providers specify per-slice air-time guarantees in terms of percentage of total air-time available at the AP. An uplink slice is all uplink service flows from UEs within a group. A downlink slice is all downlink service flows to UEs within a group.

For each UE being served by the AP 105, the AP 105 associates each UE to two slices, one uplink slice and one downlink slice. The UE transmits on the associated uplink slice, whereas the AP 105 transmits to the UE on the associated downlink slice. Each UE within the same group are associated with the same uplink and downlink slices.

Per-UE air-time for each slice, is air-time allocated by the AP 105 to the slice divided by the number of UEs in the slice. The AP 105 may allocate air-time to a slice based on an agreement between the WSP of the group and the virtual WiFi provider.

The AP 105 includes a downlink scheduler that offers proportional air-time share among slices or groups under either single-rate or multi-rate settings. Within a group of UEs, the downlink scheduler offers (1) equal air-time share among users or (2) equal throughput share among users.

General Discussion of IEEE 802.11 MAC Layer Operation

Figure 2:
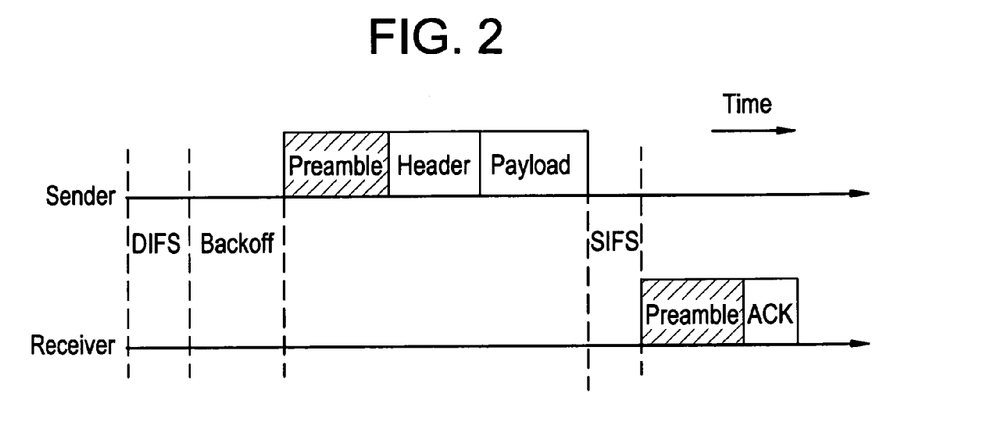
FIG. 2 illustrates an example sequence of 802.11 transmission without any collision.

FIG. 2 illustrates an example sequence of an 802.11 transmission without any collision.

In a distributed coordination function (DCF) access mode for 802.11 MAC, every UE uses an exponential backoff-based CSMA/CA mechanism to share a channel. Each UE keeps a contention window (CW) and a backoff timer, both measured in time slots. A station starts transmission of a data frame (consisting of header and payload) only after sensing the channel idle for a fixed Distributed Inter-Frame Space (DIFS) time period and the UE's backoff timer expires.

A UE's backoff timer is randomly chosen between 0 and CW-1. When a UE attempts to transmit and senses a busy channel, the UE doubles the contention window, starts a new timer, and defers transmission. When a UE senses the channel busy during the backoff duration, the UE stops the backoff timer and resumes the backoff timer when the channel becomes idle. The receiving station sends an ACK frame after a fixed Short Inter-Frame Space (SIFS) time period and after receiving the data frame successfully. Each frame is preceded by a preamble that allows the receiving station to infer parameters such as transmission rate and duration of the transmission.

As shown in FIG. 2, a channel occupancy time for the data frame includes the transmission time for the Preamble, Header and Payload. A channel occupancy time for the ACK includes the transmission time for the Preamble and the ACK frame. The air-time for a frame does not include backoff time, DIFS, or SIFS, because these components are local to the sender of each data frame. Air-time for a station (user station or the base station) is defined as the sum of the air-time for all the data frames it transmits.

IEEE 802.11e adds Quality of Service (QoS) support to DCF. IEEE 802.11e provides traffic differentiation through the following mechanisms: (1) each traffic class has a different range of backoff values specified by contention window sizes; (2) rather than the fixed DIFS, each traffic class is assigned a different Arbitrary Inter-Frame Space (AIFS), after which it can transmit its data frame; and (3) each traffic class has a maximum frame length allowed to be transmitted at once during each transmission opportunity limit (TXOP). The mechanisms (1) and (3) are also included in the IEEE 802.11n standards.

An uplink scheduler used in WiFi is referred to as a split AP and is described in G. Bhanage et al., "Leveraging wireless network virtualization for flexible sharing of WLANs", in *IEEE Global Telecommunications Conference (GLOBECOM 2010)*, December 2010, the entire contents of which are herein incorporated by reference. A split AP depends on an IP level traffic rate regulator located at every UE to control uplink traffic. This approach requires the installation of extra client software on UEs to offer bandwidth or throughput control of uplink traffic of the UEs. In addition, users may easily gain control over the client software and modify it in order to obtain more bandwidth than allowed by the AP in a virtual WiFi setting. This makes it easy for UEs to violate service level agreements between WSPs using the virtual WiFi AP and the virtual WiFi operator.

Another uplink scheduler is described in J. Yoon et al., "Maximizing Differentiated Throughput in IEEE 802.11e Wireless LANs", in *IEEE Conference on Local Computer Networks-LCN*, 2006, pp. 411-417, the entire contents of which are herein incorporated by reference. In this setup, all traffic is uplink and there is no downlink traffic. The uplink scheduler only considers the case where all UEs use the same transmission data rate. The uplink scheduler only considers the ideal case where one class of UEs is termed a reference class, and UEs belonging to other classes have a bandwidth or throughput requirement that is an integral multiple of the bandwidth requirement of a UE belonging to the reference class.

The uplink scheduler uses a MAC layer configuration parameter CWmin, the minimum contention window size for each user station, to control throughput differentiation between groups of user stations belonging to different traffic classes and maximize system throughput at the same time.

By observing the number of idle slots between two consecutive transmission attempts through an IEEE 802.11 Physical layer Clear Channel Assessment (CCA) functionality, the uplink scheduler estimates the number of virtual contending stations, which is the virtual population of the reference class. Each UE maps to one or more virtual stations. In some cases, every UE can map to more than one virtual station.

The uplink scheduler uses this information to obtain CWmin for the reference class. The CWmin for non-reference classes is obtained by setting it inversely proportional to a target throughput ratio with respect to the reference class. By adjusting CWmin this way, the uplink scheduler achieves service differentiation and aggregate throughput maximization in IEEE 802.11e wireless LANs.

However, in practice, CWmin values are configured to be in the form of power of 2. The uplink scheduler does not provide any guidelines on how to set CWmin values of UEs if the calculation yields CWmin values not in the form of power of 2. Moreover, the approach of using the number of idle slots between two consecutive transmission attempts to estimate the virtual population of a reference class requires access to the MAC firmware (that implements Physical layer functions) which is not easily accessible by higher layer software modules. In addition, this distributed way of estimating virtual population naturally leads to multiple estimates of the population. If each UE uses its own estimate to decide how to set its own CWmin value, and multiple estimates exist in the system, the way each UE sets its CWmin value is not consistent. Therefore, the result does not maximize system throughput nor provide throughput differentiation.

One downlink scheduler used in WiFi is a Deficit Transmission Time (DTT) scheduler disclosed in R. Garroppo et al., *Providing Air-time Usage Fairness in IEEE 802.11 Networks with the Deficit Transmission Time (DTT) Scheduler*.

Wireless Networks, Vol. 13, August 2007, the entire contents of which are herein incorporated by reference.

The DTT scheduler operates on top of the IEEE 802.11 MAC layer. A classifier splits outgoing traffic into several queues, on the basis of the destination MAC address. All frames held in a same queue are addressed to a same UE. A bucket is associated with each queue to account for the over-the-air time of the previous transmissions. At the end of every frame transmission, the DTT scheduler computes a Cumulative Frame Transmission Time (CFTT). The CFTT comprises all the time spent for the transmission, including all retransmission attempts, backoff and idle periods. The CFTT is also produced when the retry limit is reached with a transmission failure.

The CFTT is used to drain the bucket associated with the destination of the transmitted frame. Next, the CFTT is equally divided by the number of non-empty queues and added to the associated buckets. The bucket whose frame has just been sent, if non-empty, is included in this count.

All the buckets coupled with an empty queue are cleared (set to zero). Afterwards, the DTT scheduler picks the next frame from the queue whose associated bucket is the fullest and hands the picked frame over to MAC layer. Only one frame at a time is sent to the MAC layer, and the next frame is not sent until the previous transmission is over. This allows the scheduler to make a precise computation of the CFTT and avoids a MAC buffer to hold any other frame but the one under delivery.

Downlink Scheduling According to an Example Embodiment

Figure 3:
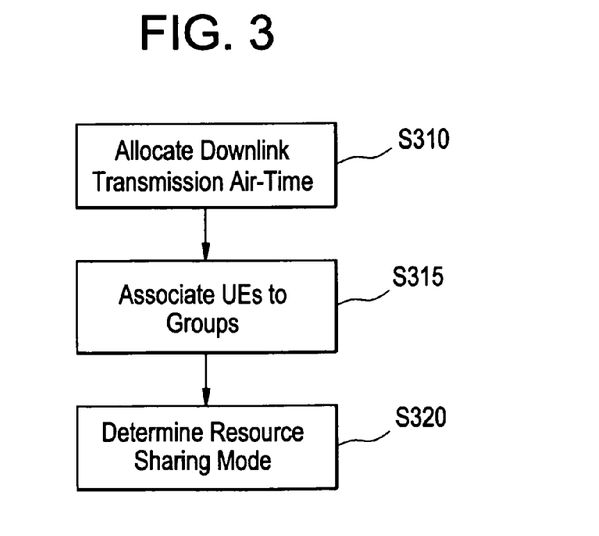
FIG. 3 illustrates a method of scheduling downlink transmissions according to an example embodiment.

FIG. 3 illustrates a method of scheduling downlink transmissions according to an example embodiment. The downlink scheduler in the AP 105 is configured to perform the method shown in FIG. 3.

The downlink scheduler divides the air-time resource allocated to the AP among the downlink flows. The downlink scheduler does not use or depend on any MAC layer configurations or MAC layer changes.

The downlink scheduler resides on the AP, and operates above the 802.11 MAC layer and below the network layer. It does not modify the MAC layer or the network layer in any way.

The downlink scheduler selects different resources (bandwidth or throughput and channel access time or air-time) to share at different levels.

At the group level, the downlink scheduler offers air-time share. Thus, the data rate the AP uses to send to one UE does not affect throughput of any other UE associated with any other group associated with the AP. The data rate the AP selects to send to a UE does affect throughput for other UEs within the same group as the UE, if within the group the equal air-time downlink mode is used. Moreover, if the equal throughput downlink mode is used within the group, the data rate the AP selects to send to a UE also affects throughput for other UEs within the same group as the UE.

Within a group, the downlink scheduler offers sharing of both throughput and air-time. The two modes of resource sharing within a group are equal throughput share and equal air-time share.

The scheduler uses two parameters for downlink scheduling. The two parameters are group size and per-slice air-time guarantees. Group size is the number of UEs belonging to a WSP receiving service from the Virtual WiFi AP. A downlink slice is associated with a group and the size of a downlink slice is identical to the size of the group to which the UEs belong.

Each downlink slice for a group is allocated an air-time in terms of percentage of total air-time available at the AP, as specified by agreements between operators and the Virtual WiFi provider.

The downlink scheduler operates in 2-stages: per-slice and within a slice.

In the per-slice stage, the downlink scheduler allocates downlink transmission air-time to a plurality of groups at S310. At S315, the scheduler associates UEs to the groups. It should be understood, that S310 and S315 may be interchanged.

At S310, the scheduler offers proportional air-time share to the groups. In other words, the scheduler determines downlink transmission slices associated with the plurality of groups. This first stage may be referred to as a Weighted Deficit Transmission Time (WDTT) Scheduler.

The WDTT scheduler uses a per-slice queue. In other words, a queue is used for each slice (for the group of user stations belonging to one WSP or a QoS class of one WSP).

The WDTT scheduler assigns each of the per-slice queues a weight. The weight is set to the per-slice air-time share derived from a Service Level Agreement (SLA) signed between the WSP and the physical WiFi AP operator. In other words, the weight indicates a percentage of the AP's downlink transmission air-time for the associated group.

For example, when there are two downlink slices A and B at the physical AP, and downlink slice A and B require 30% and 15% of total air-time at the AP, respectively, the AP assigns weights 2 and 1 to queues for slice A and slice B, respectively.

When a bucket associated with a queue is filled with a token whose value equals a fraction of cumulative frame transmission time (CFTT) for the frame just transmitted by the AP, the value is multiplied by the weight associated with the queue. When a bucket associated with a queue is drained of a token with a value that equals the CFTT for the frame just transmitted by the AP, the token value is multiplied by the weight of the queue.

Consequently, the token to be removed is based on a cumulative frame transmission time for a previously transmitted frame. The AP is configured to determine the queue associated with a largest bucket size and transmit data to the group associated with the queue associated with the largest bucket size. The AP decreases the largest bucket size based on the weight of the associated group and increases the bucket sizes of the buckets associated with queues that are not empty based on the weights of the respective associated groups.

The WDTT scheduler does not require the tracking of a data rate used by each MAC frame. Rather, the WDTT measures the transmission time used by each frame. Moreover, the WDTT offers proportional shares of air-time usage and is equivalent to Weighted Fair Queuing (WFQ) where the weight is determined by data rate.

Referring to FIG. 3, the scheduler determines a resource sharing mode at S320. S320 may be referred to as a second stage.

The second stage of the downlink scheduler is a per-UE scheduler within each slice.

Within a group of UEs belonging to the same WSP, the downlink scheduler provides equal air-time or equal throughput. In equal air-time within a slice, the downlink scheduler can be a known DTT scheduler. For equal throughput within a slice, the downlink scheduler can be a known Round Robin scheduler.

Each group can select either scheduler to offer either equal air-time or equal throughout among user stations within the group. By using a per-group scheduler at the first level, the AP can select different schedulers at the second level (within each group). Each resource sharing mode corresponds to a unique scheduler. The WSP can specify which model to use at the per-station level within its group when it signs the SLA with the AP.

In an example embodiment, the downlink scheduler provides proportional air-time share at the group level and offers two forms of sharing (equal air-time and equal throughput) within a group.

More specifically, the downlink scheduler provides priority-based Quality of Service (QoS) within the set of UEs belonging to any WSP. The form of QoS is traffic priority in terms of air-time share.

The downlink scheduler may divide a group into a first group and a second group associated with the WSP. The first group is associated with a higher quality of service than the second group.

For example, customers of a WSP may sign up for one of two classes of service. A UE in class A is offered twice as much air-time for its downlink flows as a UE in class B. In this case, UEs for the WSP are considered as two groups, one for class A and the other for class B, where the air-time requirement for the downlink slice for the group representing class A is twice as much as that for the downlink slice for the group representing class.

As described, the downlink scheduler operates at both a per-slice level and per-UE level to offer traffic control for all downlink traffic at the physical WiFi AP. It is orthogonal to any uplink scheduler.

Uplink Scheduling According to an Example Embodiment

The AP 105 includes an uplink scheduler that offers proportional air-time share among slices or groups under either single-rate or multi-rate settings. Within a group of UEs, the uplink scheduler offers (1) equal air-time share among users or (2) equal throughput share among users.

The uplink scheduler according to an example embodiment provides virtual WiFi over deployed WiFi APs. Deployed 802.11 protocols use a distributed coordination function (DCF) to arbitrate channel access. The 802.11e and the 802.11n specification add to the original DCF, and provide tunable parameters that can be used to provide QoS. The AP uses these parameters to provide service differentiation between groups. The uplink scheduler in the AP 105 is configured to perform the method shown in FIG. 4.

Figure 4:
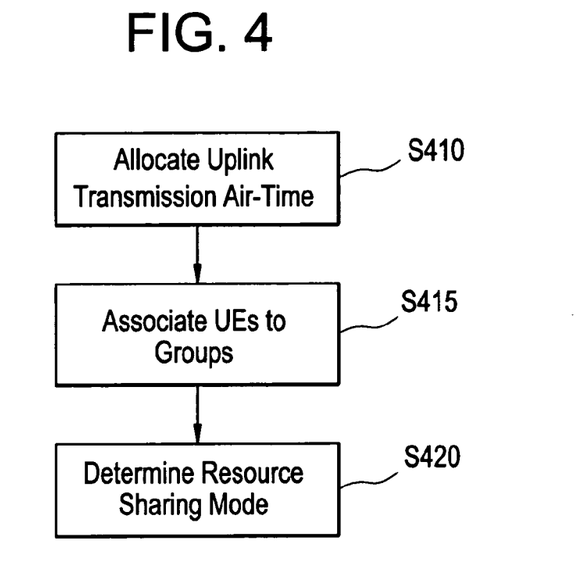
FIG. 4 illustrates a method of scheduling uplink transmissions according to an example embodiment.

The scheduler adjusts a minimum contention window (CWmin) and TXOP for each UE in the virtual WiFi network to provide differentiated service.

In a single rate environment when all stations (UEs and the AP) transmit with the same data rate, theoretical results have shown the following:
(1) Throughput from a station is inversely proportional to its CWmin value if all other parameters are kept identical for all stations.
(2) Throughput from a station is proportional to its TXOP value if all other parameters are kept identical for all stations.
(3) For any system size in terms of number of reference stations and all reference stations have the same air-time requirement and each station has identical MAC parameter settings (CWmin, TXOP among others), there exists an optimal CWmin value for each reference station that maximizes the system throughput.

Following analytical results from T. Tay et al., "A Capacity Analysis for the IEEE 802.11 MAC Protocol", *Wireless Net* works, vol. 7, pp. 159-171, 2001, the entire contents of which are herein incorporated by reference, this optimal value is $$CWmin\_opt = (n-1)*\text{sqrt}((1/t)*(E[P]+t\_d+t\_p+t\_h+t\_s+t\_p+t\_a)) \quad (1)$$

where n is the system size, t is slot time (9 micro-seconds for 802.11g), P is the average MAC data frame size, E[P] is the transmission time for an average sized MAC data frame, t_d is the DIFS duration (28 micro-seconds for 802.11g), t_p is the duration for the preamble (26 micro-seconds for 802.11g), t_h is the duration for MAC header size of 288 bits (with 54 Mbps data rate, t_h is 288/54 micro-seconds), t_s is the SIFS duration (10 micro-seconds for 802.11g), t_a is the duration for the acknowledgement (ACK) frame (with size of 112 bits) for the data frame. In 802.11g, the data rate used by the ACK frame is 24 Mbps for the 54 Mbps data frame, therefore t_a=112/24 micro-seconds.

After plugging in 802.11g specific values, given system size n and average MAC data frame size of the system P, the CWmin value to achieve maximum system throughput becomes $$CWmin\_opt = (n-1)*\text{sqrt}((E[P]+100)/9) \quad (2).$$

In a multi-rate environment where stations (user stations and the AP) may transmit with different data rates, theoretical results have shown that air-time usage for all stations (the UEs and the AP) is the same if the station's CWmin value is set to be inversely proportional to its data rate and if all other parameters are kept the identical for all stations.

The uplink scheduler according to an example embodiment selects different resources (bandwidth or throughput and channel access time or air-time) to share at different levels. At the group level, the uplink scheduler provides air-time share. This is because in 802.11 DCF, one UE's data rate affects throughput of every station associated with the AP. Within a group, the uplink scheduler provides sharing of both throughput and air-time. Both throughput and air-time sharing can be achieved if data rate is the same for all UEs within the same group. The two modes of resource sharing within a group are equal throughput share and equal time share.

In single rate environments, throughput and air-time shares are equivalent, and assigning the same CWmin to all stations (UEs and AP) enables both modes. For every frame received, the AP may determine the data rate used to send the frame from the preamble before the MAC frame header for all MAC frames (data and ACK) as shown in FIG. 2. Similarly, for every frame sent, the AP knows the data rate it is using to send the frame.

In equal throughput share mode, the uplink scheduler assigns the same CWmin to all UEs. The equal throughput share mode is compatible with existing IEEE 802.11 specifications, and can be deployed without any change to user software. By setting CWmin for a station inversely proportional to the station's data rate, stations can achieve equal air-time.

With equal air-time, each station with a different rate will receive throughput proportional to its data rate, and the system throughput does not degrade as the station with low rate does not occupy the channel any longer than other stations with higher rate. It has been shown in the literature that proportional fairness is equivalent or close to max-min fairness in terms of air-time usage as opposed to bandwidth usage.

In the equal throughput mode, the AP broadcasts Beacon messages periodically to all user stations associated with each Service Set ID (SSID) at the WiFi AP, specifying the MAC parameter values all stations should use for their data transmission, according to the IEEE 802.11 standards. These MAC parameters include CWmin and TXOP values. This means that all existing 802.11 software is immediately compatible with the uplink scheduler.

In equal air-time share mode, the uplink scheduler assigns a CWmin that is inversely proportional to the station's data rate. Since the CWmin and TXOP may vary per-client or user station, the AP may transmit the CWmin and TXOP values to each UE via an IP signal.

The WiFi specification described in IEEE 802.11: *Wireless LAN Medium Access Control (MAC) and Physical Layer (PHY) Specifications.* (2007 revision), June 2007 allows each beacon message to include an element named "Service Set ID (SSID)" and an element named "Enhanced Distributed Channel Access (EDCA) parameter set". Using these two elements, the AP can specify the EDCA parameter values (CWmin and TXOP values) for each group because each group is identified with a unique SSID. For example, the AP may include the CWmin and TXOP values for each UE within a group by including in the beacon message a pair of elements named "UE id" and "EDCA parameter set" for each UE with a profile different than that of the group it belongs to. The "UE id" may be the MAC address of the UE or some other identifier for the UE at the MAC layer.

FIG. 4 illustrates a method of scheduling uplink transmissions according to an example embodiment. The uplink scheduler in the AP 105 is configured to perform the method shown in FIG. 4.

At S410, the uplink scheduler allocates uplink transmission air-time to a plurality of groups. At S415, the scheduler associates UEs to the groups. It should be understood, that S410 and S415 may be interchanged.

At S410, the uplink scheduler offers proportional air-time share to the groups. In other words, the scheduler determines uplink transmission slices associate with the plurality of groups.

As part of step S410 or S415 or as a separate step, the scheduler generates an access profile for each user station associated with the physical WiFi AP as well as an access profile for the WiFi AP based on input parameters. The access profile for a station (UE or the AP) includes two 802.11 MAC parameter settings, CWmin and TXOP.

The input parameters for the uplink scheduler are group size, average frame size, per-station data rate, highest data rate used by the AP to send data frames to any UE, per-slice air-time guarantees, and sum of percentage of total air-time available at the AP for all the downlink slices. Group size is the number of UEs belonging to a WSP or operator receiving service from the Virtual WiFi AP. An uplink slice is associated with a group and the size of an uplink slice is identical to the size of the group the user stations belong to. Average frame size is the average frame size for all frames sent and received by the physical AP. Per-station data rate is the data rate for each frame sent by a UE and received by the physical WiFi AP. For each uplink slice from a user station, per-slice air-time guarantee is in terms of percentage of total air-time available at the AP as specified by the Operator SLAs with the Virtual WiFi provider. The sum of percentage of total air-time available at the AP for all the downlink slices is specified by the Operator SLAs with Virtual WiFi providers. This sum represents the air-time guarantee for the AP when the AP is treated as a station to compete for the radio channel with UEs.

The uplink scheduler selects the highest data rate used by any UE as a top rate. The top rate does not necessarily correspond to a reference station.

The uplink scheduler produces per-station access profiles in two stages.

In a first stage, the uplink scheduler assumes all stations transmit with a same top rate, and then considers per-slice and per-station throughput share. In the single-rate environment, the percentage throughput share is identical to the percentage air-time share. Per-station throughput share is per-slice throughput share divided by slice size. The throughput share for the AP is the sum of the throughput share for all downlink slices.

The uplink scheduler considers the UE as one or more reference stations, and counts each station i in all uplink slices as $V_i$ reference stations, where $V_i$ is a ratio of the throughput share of station i to the reference station.

In virtual WiFi, an access point (AP) allocates bandwidth or throughput to reference stations. A reference station is defined as a station that receives the largest unit of bandwidth or throughput such that each station (UE or base station, that is, the AP) can be considered as an integral number of reference stations. As a result, each station maps to one or more reference stations.

In an infrastructure mode WLAN, the AP contends for aggregate downlink traffic with uplink traffic from UEs, and its throughput share is for all downlink slices. The value $V_i$ for the AP is therefore the ratio of the throughput share of all downlink slices to the reference station.

The uplink scheduler considers a sum of all the $V_i$ values as the contending population of the WLAN, defined as a system size n. The uplink scheduler calculates CWmin for each reference station using the system size n and average frame size P based on equation (1). Equation (1) becomes equation (2) for IEEE 802.11g. The CWmin for the reference station or reference station may be referred to as Cd. The CWmin for each station i may also be referred to as $C_i$.

In practice, the CWmin can only be set to a power of 2, so the largest power of 2 less than the theoretical value is selected for $C_d$ based on results from the test bed experiments described below.

The uplink scheduler determines the CWmin value for a station i (including the AP) as $$C_i = C_d / V_i \qquad (3)$$

Given $C_d$ is a power of 2, when $V_i$ is not power of 2, the uplink scheduler uses both CWmin and TXOP settings to achieve a throughput ratio of $V_i$ between station i and the reference station. For example, when $V_i$=3, $C_d$=32, the uplink scheduler sets $C_i$=16 and sets $TXOP_i$ to be 1.5 times as long as that for the reference station. The TXOP setting for the reference station is the default setting where one data frame is transmitted during every transmit opportunity. In practice, reducing TXOP setting to lower than the default setting results in no effect on the actual 802.11 protocol behavior as described below. As a result, the uplink scheduler selects CWmin value for station i ($C_i$) such that $TXOP_i$ must be at least the same length as the TXOP for the reference station. For example, setting $C_i$ to be 8 and $TXOP_i$ to be 0.75 times as long as that for the reference station achieves throughput ratio of $V_i$ to be 3 between station i and the reference station in theory. However, in practice, it only achieves throughput ratio of 32/8=4.

Note that the profile for the AP is determined in the first stage.

In a second stage, the uplink scheduler adjusts the access profiles for the stations with data rates lower than the top rate such that the stations use the same air-time as when they use the top rate.

For each station i, the uplink scheduler increases $C_i$ to $f_i * C_i$ where $f_i$ is the ratio of top rate to the data rate used by station i. For example, assume $C_i$ is 32 with a top rate 24 Mbps. If station i uses 6 Mbps, the uplink scheduler sets $C_i$ to be 128.

Referring to FIG. 4, the uplink scheduler determines a resource sharing mode at S420. S420 is per-station scheduler within each slice.

Within a group of UEs belonging to the same WSP the uplink scheduler provides equal air-time share or equal throughput share. Each group can select either scheduler to offer either equal air-time or equal throughout among user stations within the group.

While maintaining per-slice air-time share, the uplink scheduler provides the option of equal air-time or equal throughput to UEs within an uplink slice. The above calculation assigns different access profiles to UEs with different data rates to achieve equal air-time share among UEs. In equal time share mode, the uplink scheduler assigns a CWmin that is inversely proportional to the UE's data rate. Since the CWmin and TXOP may vary per-client or user station, the AP may transmit the CWmin and TXOP values to each UE via an IP signal.

To offer equal throughput share within a slice under variable data rate, the uplink scheduler first calculates a ratio q of the top rate to the lowest data rate in the slice. Then the uplink scheduler divides the throughput requirement for the slice by q therefore preserving its air-time share, recalculates a total number of reference stations for the system and generates per-station access profiles. The throughput requirement per slice is determined in the first stage of the uplink scheduler assuming all stations transmit with the same top rate.

In this setting, all UEs in the uplink slice with multiple data rate is assigned the same CWmin and TXOP, therefore achieving equal throughput share within the uplink slice. At the same time air-time share for the slice is preserved. For UEs in the throughput share mode, the AP broadcasts Beacon messages periodically to all user stations associated with each Service Set ID (SSID) at the WiFi AP, specifying the MAC parameter values all UEs should use for their data transmission, according to the IEEE 802.11 standards. These MAC parameters include CWmin and TXOP values. This means that all existing 802.11 software is immediately compatible with the uplink scheduler.

Figure 5:
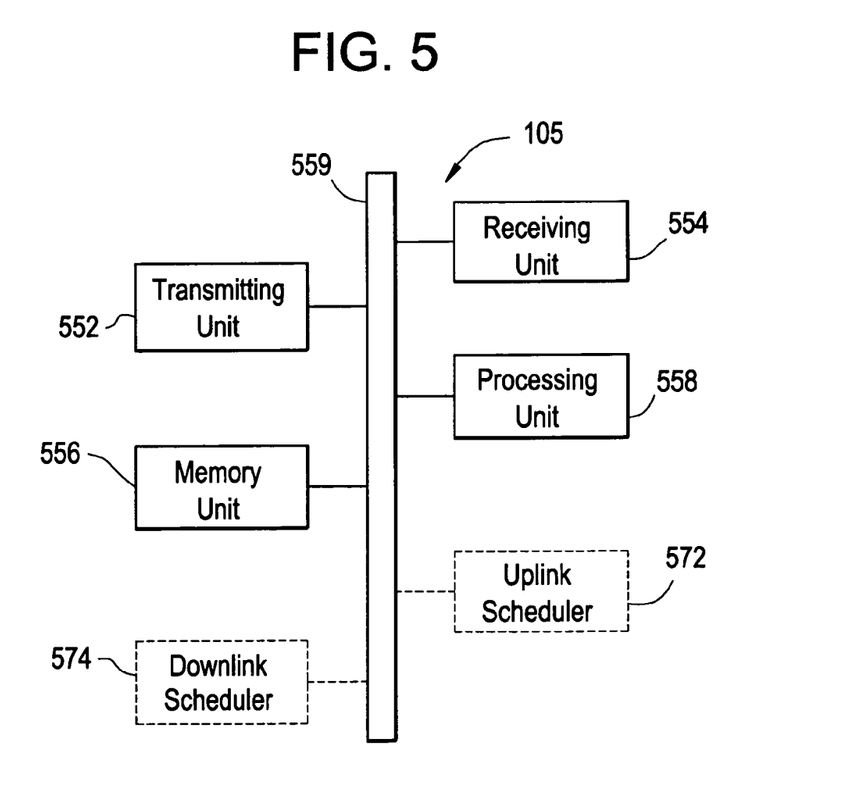
FIG. 5 illustrates an example embodiment of the access point shown in FIG. 1.

FIG. 5 illustrates an example embodiment of the AP 105. It should be also understood that the AP 105 may include features not shown in FIG. 5 and should not be limited to those features that are shown.

Referring to FIG. 5, the base station AP 105 may include, for example, a data bus 559, a transmitting unit 552, a receiving unit 554, a memory unit 556, and a processing unit 558.

The transmitting unit 552, receiving unit 554, memory unit 556, and processing unit 558 may send data to and/or receive data from one another using the data bus 559. The transmitting unit 552 is a device that includes hardware and any necessary software for transmitting wireless signals including, for example, data signals, control signals, and signal strength/quality information via one or more wireless connections to other network elements in the wireless communications network 100. For example, the transmitting unit 552 transmits the access profiles to the UEs, respectively.

The receiving unit 554 is a device that includes hardware and any necessary software for receiving wireless signals including, for example, data signals, control signals, and signal strength/quality information via one or more wireless connections to other network elements in the network 100.

The memory unit 556 may be any device capable of storing data including magnetic storage, flash storage, etc. The memory unit 556 is configured to store the downlink and uplink schedulers as software. Alternatively, an uplink scheduler 572 and a downlink scheduler 574 may be implemented using hardware. The uplink scheduler 572 resides on top of the MAC layer. The downlink scheduler 574 also resides on top of the MAC layer below the IP layer.

The processing unit 558 may be any device capable of processing data including, for example, a microprocessor configured to carry out specific operations based on input data, or capable of executing instructions included in computer readable code.

For example, the processing unit 558 is configured to execute the methods shown in FIGS. 3 and 4 when the downlink and uplink schedulers are stored in the memory unit 556.

Experiment and Practical Guidelines

Next, the below described experiment was performed using MadWifi driver running 802.11g to derive practical guidelines to adjust the uplink scheduler. The experiments are conducted in a single 802.11g cell indoor environment with one AP and five stations.

Thinkpad laptops running GNU/Linux (kernel version 2.6.26-2-686) were used for the AP and UEs. A Cisco Aironet 802.11 a/b/g adapter (with Atheros chipset) and MadWifi-0.9.4 device driver were used for WLAN interface. The AP is configured to operate on channel 9 (2.452 GHz) in 802.11g mode. The following default features are turned off for all devices in MadWifi: fast frames, turbo and extended range. Fast frames in MadWifi enable frame aggregation. It is a non-802.11 conformant feature that further optimizes standard 802.11 system throughput.

The UEs are located 3 feet away from the AP and 3 feet apart from one another. Iperf is used for backlogged UDP traffic generation. The default UDP payload size is set to be 1472 bytes, this leads to 1500 bytes of MAC payload size.

The default CWmin value is 16 and the default TXOP value is 0 for all tests when these parameters are not specified.

In each experiment for all UDP flows, flow duration is set to 70 seconds and all flows are started during the first 10 seconds. Measurements are collected over the next 60 seconds using tcpdump. Each experiment is conducted 10 times and the average of throughput of each UDP flow is reported.

Selecting CWmin

In practice, CWmin is set to power of 2 instead of any integer. The uplink scheduler takes into consideration these practical constraints. The uplink scheduler selects CWmin for the reference station to maximize system throughput. Moreover, the uplink scheduler selects CWmin for other stations to achieve throughput differentiation.

Given system size n, which is the number of reference stations, and average IP packet size P, one CWmin value $C_d$ for the reference station can be derived from equation (2) for 802.11g.

Figure 6:
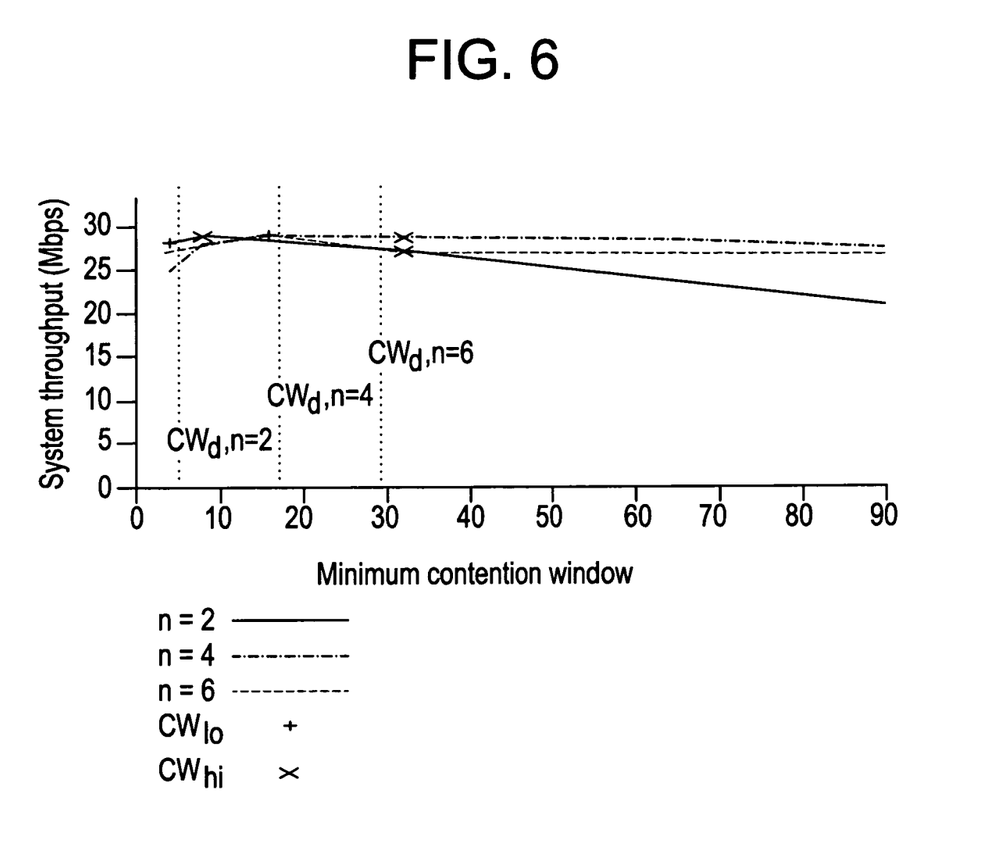
FIG. 6 illustrates throughput against CWmin setting for all stations with system size ranging from 2 to 6.

FIG. 6 illustrates throughput against CWmin setting for all stations with system size ranging from 2 to 6. FIG. 6 illustrates there is a range of CWmin values that maximizes system throughput.

In practice, CWmin values can only be set as power of 2. Given any CWmin value C, a parameter C_lo is defined as a largest power of 2 that is smaller than C, and a parameter C_hi is defined as a smallest power of 2 that is larger than C. FIG. 6 shows setting CWmin to MAX(8,C_lo) in practice maximizes system throughput.

Example embodiments can be applied to the determination of the CWmin value of the reference station $C_d$. This is because the system is treated as a number of reference stations, where each UE i represents $V_i$ reference stations. As described, the process of CWmin determination for each UE consists of a few steps. In the first step, the scheduler uses equation (1) or (2) to determine optimal CWmin $C_d$ for the reference station. The scheduler sets CWmin $C_d$ for the reference station to be in the form of power of 2. In a second step, the scheduler determines $C_i$ for each UE i based on $C_d$ and $V_i$.

If $V_i$ is not in the form of power of 2, $C_i$ will not be in the form of power of 2. Consequently, the scheduler defines $V_{i\_lo}$ be the largest power of 2 smaller than or equal to $V_i$, and sets a $C_i$ value in practice $C_{d\_practice}$ to be $$C_{d\_practice} = C_d / V_{i\_lo} \quad (4)$$

wherein both $C_d$ and $V_{i\_lo}$ are in the form of power of 2, $C_{d\_practice}$ must be in the form of power of 2.

In a third step, the scheduler sets $TXOP_i$ to be the transmission time of $TXOP_{i\_frame}$ frames, where $$TXOP_{i\_frame} = V_i / V_{i\_lo} \quad (5)$$

Selecting TXOP

After the uplink scheduler selects CWmin, the uplink scheduler selects TXOP for each station.

TXOP is a feature introduced in 802.11e, and it ranges from 0 to 8160 micro-seconds in increments of 32 microseconds. The value of 0 specifies during one TXOP, exactly one frame can be transmitted. Therefore, setting TXOP to 0 and to the transmission time of one frame is equivalent.

In an 802.11g setup with 26 micro-seconds of preamble time, 1500 byte of MAC payload leads to 1536 byte of MAC frame size because of a 36 byte MAC header. Therefore, the transmission time for one frame with data rate of 54 Mbps becomes 256 micro-seconds.

Figure 7:
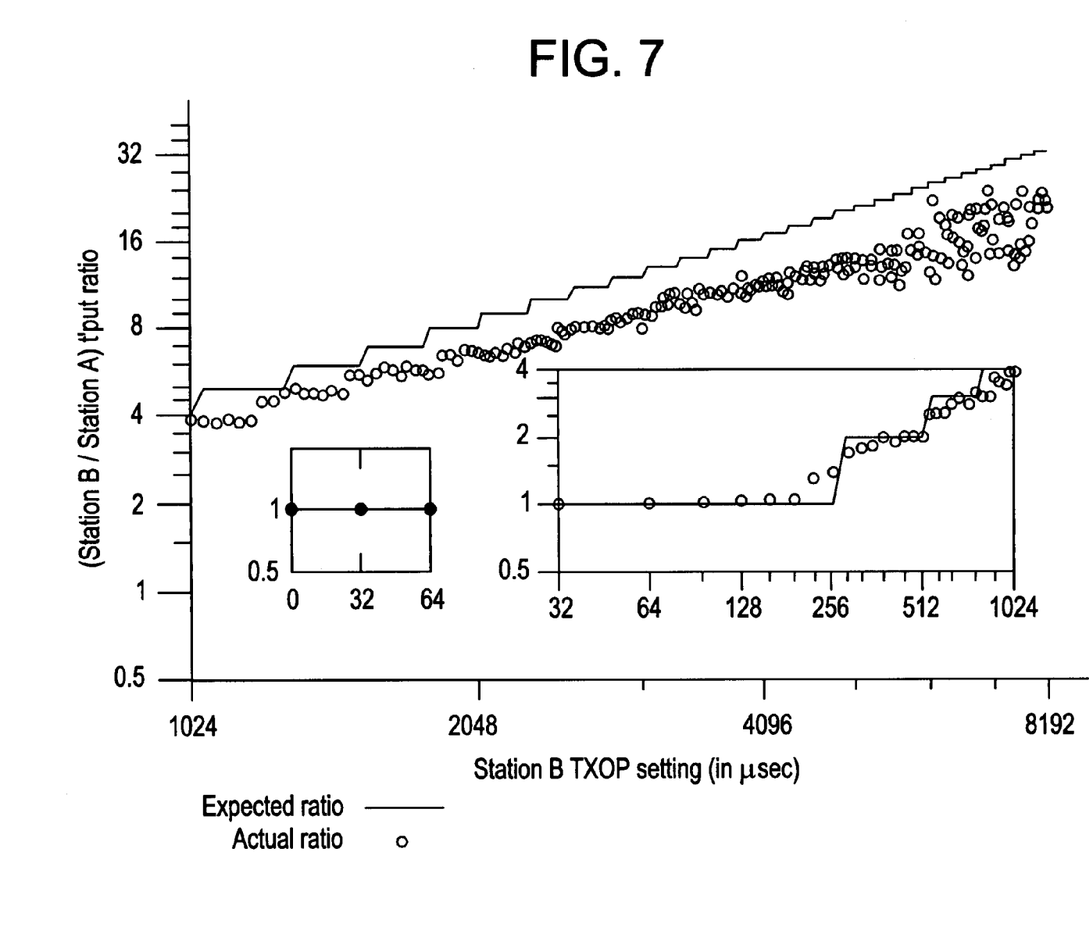
FIG. 7 illustrates a relationship between throughput ratio and TXOP.

Two stations A and B send UDP flows to the AP with TXOP values T_A and T_B, respectively. T_A is fixed to 0 and T_B is increased linearly from 0 to 8192 micro-seconds with a step size of 32 micro-seconds as this is the range for TXOP.

From FIG. 7, instead of a step function, a roughly linear relationship is illustrated between throughput and station Bs TXOP value T_B. Throughput ratio between station B and station A stays constant at 1 when TXOP value is less than 224 micro-seconds, which means only one frame is sent out per TXOP. Starting at TXOP value being 224 micro-seconds, the throughput ratio starts its linear increase with the ratio slightly below the expected value shown as a step function. For example, if TXOP is set to transmit 1.5 frames, it transmits one frame 50% of the time during each TXOP, and transmits two frames per TXOP the other 50% of the time achieving an average of 1.5 frames per TXOP.

As T_B, the TXOP for Station B, increases beyond 1024 micro-seconds, which corresponds to 4 frames per TXOP, a gap between expected throughput ratio and actual ratio widens. For example, when T_B is 1024 micro-seconds, the actual ratio is 3.9, which is close to the expected ratio of 4. When T_B is 2560 micro-seconds, the actual and expected ratios are 7.8 and 10, respectively. This gap widens even further when T_B is 8192 micro-seconds, the actual and expected ratios are 21 and 32, respectively. As TXOP increases, the train of frames transmitted in one TXOP increases in length. Any MAC frame loss will cause the sender to abandon the current TXOP, therefore reducing the throughput improvement offered by a large TXOP. As a result, a long TXOP does not result in expected throughput improvement. Therefore in practice, the uplink scheduler uses FIG. 7 as a guideline to provide linear throughput ratio up to TXOP of 1024 micro-seconds. However, to compensate for the restriction of CWmin to be in the form of power of 2, the TXOP value provides throughput ratio in the range of [1,2), that is, greater than or equal to 1 and less than 2. Setting the $TXOP_i$ to a real value in the range [1,2) provides throughput ratios $V_i$ between UE i and the reference station with the restriction that CWmin can only be in the form of power of 2.

TXOP$_i$ is in the form of micro-seconds rather than number of frames. Therefore, the scheduler provides linear throughput ratio up to TXOP$_i$ value of 512 micro-seconds which corresponds to 2 frames per transmit opportunity.

The range from 1024 to 8192 micro-seconds does not offer a linear relationship between throughput and TXOP$_i$. The actual throughput differentiation depends on traffic on the network, which varies. As a result, it is difficult to use TXOP$_i$ value from 1024 to 8192 to achieve accurate throughput differentiation under variable network conditions.

Combining the guideline to set CWmin in practice to create throughput ratio in the form of power of 2, with the guideline to set TXOP to create any throughput ratio between 1 and 2, any throughput ratio can be created to differentiate between stations.

In an example embodiment, the uplink scheduler provides proportional air-time share at the group level and offers two forms of sharing (equal air-time and equal throughput) within a group.

More specifically, the uplink scheduler provides priority-based Quality of Service (QoS) within the set of UEs belonging to any WSP. The form of QoS is traffic priority in terms of air-time share.

The uplink scheduler may divide a group into first group and a second group associated with the WSP. The first group is associated with a higher quality of service than the second group.

For example, customers of a WSP may sign up for one of two classes of service. A UE in class A is offered twice as much air-time for its uplink flows as a user station in class B. In this case, UEs for the WSP are considered as two groups, one for class A and the other for class B, where the air-time requirement for the uplink slice for the group representing class A is twice as much as that for the uplink slice for the group representing class B.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method for allocating uplink transmissions from a plurality of user equipments (UEs) to a base station, the method comprising:
   allocating uplink transmission air-time of the base station to a plurality of groups;
   associating each of the plurality of UEs to the plurality of groups, a throughput of each associated UE in a same group being affected by remaining UEs in the same group; and
   determining a resource sharing mode associated with each of the plurality of groups, the resource sharing mode being one of a first mode and a second mode, the base station allocating a same throughput to each associated UE in an associated group of the plurality of groups in the first mode and the base station allocating a same transmission air-time to each associated UE in the associated group in the second mode, the determining the resource sharing mode includes,
      determining a profile associated with the base station and a profile associated with each of the plurality of UEs based on the resource sharing mode, a size of the associated group, an average frame size of frames sent and received by the base station, a data rate of a UE associated with the profile and a highest data rate among all of the plurality of UEs and the base station, the allocated uplink transmission air-time for the associated group and air-time for a sum of downlink transmissions allocated to the plurality of groups by the base station, and
      transmitting the associated profiles to the plurality of UEs, respectively; and
   receiving transmissions from the plurality of UEs based on the transmitted profiles.

2. The method of claim 1, wherein for at least one of the plurality of groups, the transmitting includes transmitting a beacon to the plurality of UEs associated with the at least one group, the beacon indicating that each UE has the same profile.

3. The method of claim 2, wherein the transmitting the beacon transmits the beacon in the first mode.

4. The method of claim 1, wherein for at least one of the plurality of groups, the transmitting includes transmitting signals to the plurality of UEs associated with the at least one group, respectively.

5. The method of claim 4, wherein the transmitting signals transmits the signals in the second mode.

6. The method of claim 1, wherein each profile includes a minimum contention window value and a transmission opportunity limit value.

7. The method of claim 1, wherein $$C_i = C_d / V_i$$

wherein $C_i$ is a minimum contention window value for the associated UE or base station i, $C_d$ is a contention window value for a reference UE or base station d, and $V_i$ is a ratio of throughput of the UE or base station i to the reference UE or base station d.

8. The method of claim 7, the determining a profile includes adjusting $C_d$ to $C_{d\_practice}$ such that $C_{d\_practice}$ is one of a smallest power of 2 larger than $C_d$ or a largest power of 2 smaller than $C_d$.

9. The method of 8, wherein the adjusting $C_d$ includes adjusting $C_{d\_practice}$ to be $$MAX(8, C\_lo)$$

wherein C_lo is the largest power of 2 smaller than $C_d$.

10. The method of claim 1, the determining a profile for at least one of the plurality of UEs includes,
   adjusting the profile such that each associated UE in the group is allocated the same transmission air-time.

11. The method of claim 1, the determining a profile for at least one of the plurality of UEs includes,
   adjusting the profile such that each associated UE in the group is allocated the same throughput.

12. The method of claim 7, wherein the determining a profile adjusts $C_i$ to be a power of 2.

13. The method of claim 12, the determining determines a transmission opportunity limit value for each of the plurality of UEs.

14. The method of claim 6, further comprising:
   determining an allocated throughput for at least one UE, the determining an allocated throughput including,
      adjusting the minimum contention window value in the profile for the at least one UE, and
      adjusting the transmission opportunity limit value after adjusting the minimum contention window value.

15. The method of claim 6, further comprising:
   determining an allocated throughput for the base station, the determining an allocated throughput including,
      adjusting the minimum contention window value for the base station, and adjusting the transmission opportunity limit value for the base station after adjusting the minimum contention window value for the base station.

16. The method of claim 1, further comprising:
determining a contention window value for each of the plurality of groups, the UEs having the determined contention window value for the associated group.

17. The method of claim 1, further comprising:
determining a contention window value and a transmission opportunity limit (TXOP) value for the base station.

18. The method of claim 1, wherein the allocating allocates the uplink transmission air-times to each of the plurality of groups, the allocated transmission air-times independent of the number of the plurality of UEs.

19. The method of claim 1, wherein at least one group is associated with a different operator.

20. The method of claim 19, wherein the at least one group includes a first group and a second group associated with a first operator, the first group being associated with a higher quality of service than the second group.

21. The method of claim 1, wherein the base station is a WiFi access point.

22. The method of claim 1, wherein the allocating includes allocating a portion of the uplink transmission air-time to each group.

* * * * *